United States Patent [19]

Eisenbarth et al.

[11] Patent Number: 5,530,562
[45] Date of Patent: Jun. 25, 1996

[54] APPARATUS FOR IMAGE ACQUISITION WITH SPEED COMPENSATION

[75] Inventors: Christoph Eisenbarth, El Granada; Ira Finkelstein, San Jose; Dennis McGhie, Portola Valley; Edward Panofsky, Woodside, all of Calif.

[73] Assignee: De La Rue Giori S.A., Lausanne, Switzerland

[21] Appl. No.: 926,775

[22] Filed: Aug. 6, 1992

[51] Int. Cl.$^6$ ................ H04N 1/40; H04N 1/04
[52] U.S. Cl. ............. 358/496; 358/486; 358/443; 358/446
[58] Field of Search ............. 358/75, 80, 76, 358/78, 412, 446, 486, 496, 443, 471; 340/717; 250/71, 214, 214 C, 556; 348/251

[56] References Cited

U.S. PATENT DOCUMENTS

| | | | |
|---|---|---|---|
| 3,560,651 | 2/1971 | Roth | 358/496 |
| 3,975,761 | 5/1975 | Taudt | 358/78 |
| 4,034,407 | 2/1976 | Rivers | 358/267 |
| 4,591,727 | 5/1986 | Gaebelein | 250/578 |
| 4,776,021 | 10/1988 | Ho . | |
| 4,996,605 | 2/1991 | Taniguchi | 358/474 |
| 5,014,324 | 5/1991 | Mazumder . | |
| 5,047,871 | 9/1991 | Meyer | 358/486 |
| 5,101,282 | 3/1990 | Honma | 358/451 |

FOREIGN PATENT DOCUMENTS

| | | |
|---|---|---|
| 265724 | 8/1989 | Germany . |
| 54-27559 | 8/1979 | Japan . |
| 0196190 | 8/1983 | Japan . |

OTHER PUBLICATIONS

WO-A-91 15919 (S & R Tech Development, Inc.) 17 Oct., 1991; p. 8, line 20–p. 9, line 25; figure 1.
Patent Abstracts of Japan; vol. 009, No. 296 (P–407) 22 Nov. 1985 & JP-A-60 133 415 (Dainihon Screen Seizou KK) 16 Jul. 1985.
European Search Report No. EP 93 81 0533; No. 93810533.5 Communication.

*Primary Examiner*—Sandra L. O'Shea
*Assistant Examiner*—John Ning
*Attorney, Agent, or Firm*—Kane, Dalsimer, Sullivan, Kurucz, Levy, Eisele and Richard

[57] ABSTRACT

An image acquisition system includes a transport mechanism for transporting sheets of objects past a sensor. The sensor scans the objects and generates data streams which are scaled by a multiplier to compensate for the speed variation of the transport mechanism. At speeds much lower than a nominal speed, the scanning rate of the sensor is increased to generate several data streams for each scanned line, which are then combined in a single speed corrected signal stream for further processing.

7 Claims, 2 Drawing Sheets

APPARATUS FOR IMAGE ACQUISITION WITH SPEED COMPENSATION

BACKGROUND OF THE INVENTION

1. Field of Invention

This invention pertains to an image acquisition system, and more particularly to an apparatus used for the acquisition of images of a plurality of printed sheets arranged as a continuous web or a plurality of cut printed sheets fed continuously, to determine whether these printed sheets are acceptable, said apparatus including means for compensating for the speed of the sheets.

2. Description of the Prior Art

Printed sheets may be checked and validated using a device having a transport mechanism for transporting the sheets at a nominal speed past a stationary position, and scanning them with sensor means to generate electronic images thereof. The scanning may be accomplished using solid state sensors such as CCDs (Charge Coupled Devices) arranged to scan a line, self scanning silicon photodiode linear arrays, including integrating photodiode elements, or other single, linear, two-dimensional array integrating sensors, and so on. However, if the sensor integration sampling rate is held constant, all these devices are unacceptable because they produce images with geometric distortion due to the variations in the speed of the object being scanned.

To solve the geometric distortion problem, previous devices have included a synchronization device, such as a shaft encoder, on the motivating transport to synchronize the sampling rate to the motion. In this implementation, the value of the signal coming from the scanning means is not consistent because the signal is integrated over the sampling period making it proportional to the amount of light reaching the sensor and to the amount of time between samples. Therefore, variation in the movement of the sheet being scanned results in a proportional distortion of the signal.

Some previous devices have compensated for the variations in signal strength by Automatic Gain Control (AGC). This method has only a limited dynamic range and moreover the resulting image gain is affected by image content. Furthermore, the scanning means may have a significant signal to noise ratio. If the gain is adjusted too high, the resulting signal will be too noisy to produce acceptable results.

Other previous devices have compensated for the variations in sample movement by preventing the scanning means from the integrating light for a portion of the time between samples and keeping the time the scanning means is integrating constant thus obtaining a consistent signal. However, this method distorts the information because not all of the surface being scanned contributes equally to the signal. While the scanning means is being held idle, the information from the object is lost.

Yet other previous devices have corrected for speed changes by detecting the speed and adjusting a variable neutral density filter between the camera and the object. This approach requires a high degree of mechanical complexity, limited dynamic range, and a limited reaction time to rapid changes in velocity.

OBJECTIVES AND SUMMARY OF THE INVENTION

In view of the above-mentioned disadvantages of the prior art, an objective of the present invention is to provide an image acquisition system wherein the images obtained from the scanning means are stabilized to compensate for variations in the speed of the moving object being scanned.

A further objective is to provide an automatic speed compensation apparatus which is capable of handling speed variations of a wide range.

Other objectives and advantages of the inventor shall become apparent from the following description of the invention. Briefly, an image acquisition apparatus constructed in accordance with this invention, consists of a transport mechanism for transporting an object past a sensor, and sensor control means for controlling the operation of the sensor. The speed of the transport mechanism is constantly monitored and a speed multiplier output signal is generated indicative of the transport mechanism speed. This output is used to scale the amplitude of the scanner output to compensate for speed variations of the transport mechanism. If the speed dips below a preset threshold, such as 50%, the sampling rate of the scanner may also be increased, and additional computation performed to compensate for the change in sampling rate.

DETAILED DESCRIPTION OF THE INVENTION

Figure 1:
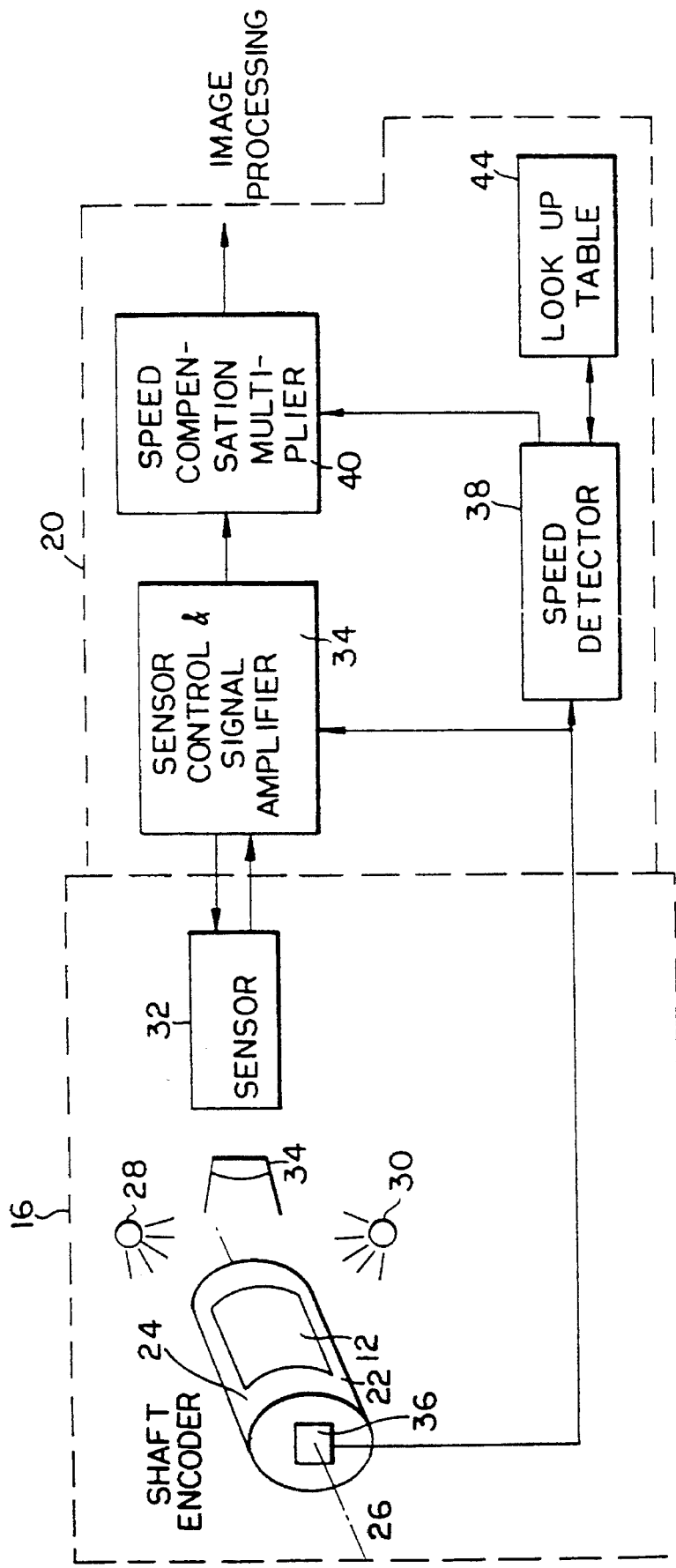
FIG. 1 shows a block diagram for a preferred embodiment of the invention.

Details of one embodiment of the invention are shown in FIG. 1. In this Figure, the scanning station includes a drum 22, having a cylindrical surface 24 which carries a sheet 12 and rotating about an axis 26. Several lamps 28, 30 are used to illuminate sheet 12. A scanning means or sensor 32 is used to scan sheet 12 through a lens 34 which focuses an image of the sheet 12 onto the sensor. The sensor may consist for example of a linear array of CCDs (Charge-Coupled-Devices) arranged to scan essentially a single line extending along the width of the sheet 12 and is controlled by a sensor control and amplifier circuit 34.

A shaft encoder 36 is connected to the drum 22 and acts as a synchronization device. Signals from the shaft encoder 36 are routed to the sensor control circuit 34 to synchronize the sampling of the sensor output. The sensor control circuit 34 contains the timing control for operation of the sensor 32, and amplification and signal conditioning of the sensor output and may perform conversion to digital information. Geometric distortion is removed by sampling the sensor signal at precise intervals of scanning motion, the line spacing, and reading the sensor data.

The output of the shaft encoder 36 is also routed to a speed detector circuit. The speed detector circuit performs signal conditioning, filtering, speed determination, and processing on the shaft encoder signal to produce a speed multiplier output. This output and the output of the sensor control circuit are multiplied together in a multiplier circuit 40 to exactly compensate the sensor signal for variations in the speed of drum 22 as discussed more fully below. This compensation can be precise because the sample period and the multiplier are based on identical data from the shaft encoder synchronization device.

More specifically, the sensor 32 and sensor control and signal amplifier circuit 34 operate to generate at a certain preselected rate determined by the physical characteristics of the sensor, the data handling capabilities of the processor 20, and so on. The information from sensor 32 is provided as a data stream corresponding to a scanned line. The data processor 20 assembles this data to generate an image of the sample. However, if the speed of drum 22, and hence sheet 12, deviates from a nominal speed, the intensity of the image of sheet 12 is distorted because the sensor 32 scans each line for a scanning period larger or smaller than the scanning period required for the normal drum speed. In the embodiment of FIG. 1, multiplier 40 is used to adjust the amplitude of the signals from sensor control and signal amplifier circuit 34 to compensate for the speed variation of drum 22. More specifically, speed detector 38 generates a speed multiplier output which is selected to scale the amplitudes of the output of sensor 32 to compensate for the speed variation of drum 22. For example, if the drum revolves at a speed which is 5% higher than its normal speed, the output of sensor control circuit 34 is reduced by 5%. Speed detector 38 will supply a multiplier value corresponding to 105%, which when multiplying the reduced value from circuit 34 compensates for the increased speed.

The value of the multiplier generated by speed detector 38 is preferably adjusted to conform to the response of sensor 32 at relatively low speed variations, the response of sensor 32 usually also exhibits a linear variation. However, at higher speed variations, the response of sensor 32 may become non-linear. Accordingly, speed detector 38 may include means of determining the proper scaling multiplier for the sensor 32, such as for example, a look-up table 44.

Figure 2:
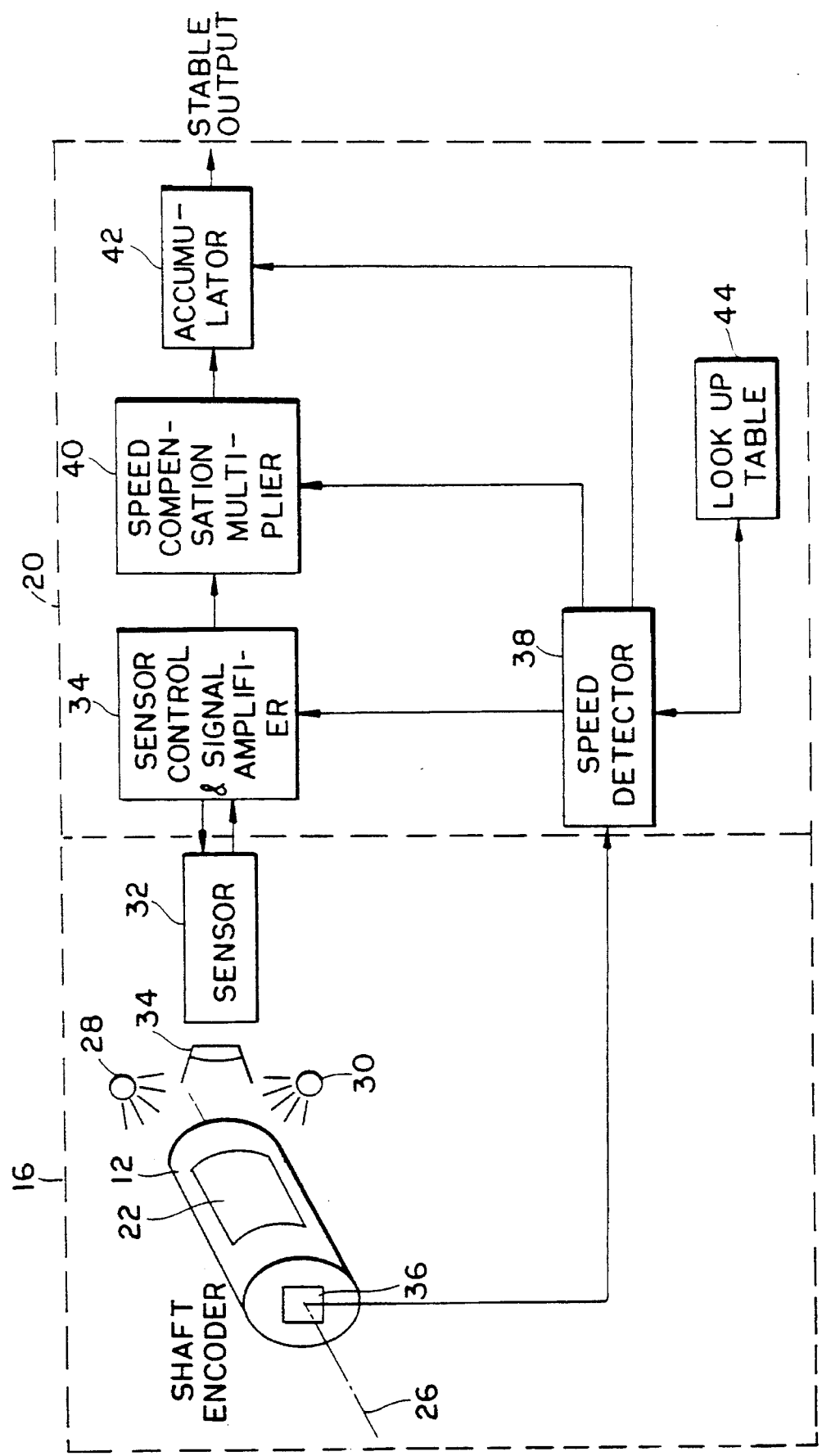
FIG. 2 shows a block diagram for another embodiment of the invention.

The embodiment of FIG. 1 allows accurate scanning of objects with a speed range of about 2:1. However, a much wider speed range acquisition can be attained by an enhancement of the invention illustrated in FIG. 2. As in the embodiment of FIG. 1, the illuminated sheet 22 is moved in front of a lens 34 which focuses the image of the sheet on the sensor 32. Signals from the shaft encoder 36 are routed to the speed detector circuit 38. The speed detector circuit performs signal conditioning, filtering, and speed determination as before. The detected speed is analyzed to determine a speed range. If the transport speed is in the range between one-half the maximum rate and the maximum rate, the sensor control is operated conventionally: signals sent to the sensor control instruct it to sample and scan the sheet 22 once per each line spacing. The speed detector computes a speed multiplier output which is multiplied by the sensor value to exactly compensate the sensor signal for variations in the sample period. The speed detector sends a signal to an accumulator circuit 42 to pass the data unchanged. In this speed range, this implementation operates identically to the apparatus described in the first embodiment description.

When the speed detector senses a transport speed less than one-half the maximum, but more than one-quarter the maximum, synchronized signals are sent to the sensor control, multiplier and accumulator. Under these circumstances, the sensor 32 may be overloaded because of the excessive scan time period. Advantageously, the scan period is reduced as follows. In this speed range, the sensor control samples and reads out the sensor twice per each line spacing. The speed detector determines a speed multiplier output which exactly compensates the sensor signal for variations in the now shortened scan period. This computation may involve the use of look-up table 44 as described above. The speed detector sends a signal to the accumulator circuit 42 to accumulate pairs of sensor samples. The accumulator 42 combines the two sample sets for each scanned line to derive a composite sampled set for that line. For example, sensor 32 may include 8,000 sensor elements arranged to produce normally a stream of 8,000 signals representing a scan line across sheet 22, when the drum is rotating at its normal speed. These signals after suitable A/D conversation are fed by sensor control and amplification circuit 34 to the speed compensation multiplier 40. If the speed of drum 12 drops to about half of its speed, then the scanning rate of sensor 32 is doubled to produce two streams of 8,000 signals for each scan line. These two streams, after scaling by multiplier 40 are combined, two at a time (for example, by addition and division by 2) by accumulator 42 to produce a single stream of 8,000 signals for the processor.

When the speed detector senses a transport speed less than one-quarter the maximum, but more than one-eighth the maximum, signals are sent to the sensor control, multiplier and accumulator. In this speed range, the sensor control samples and reads out the sensor four times per each line. The speed detector computes a speed multiplier output which exactly compensates the sensor signal for variations in the shortened sample period. The speed detector sends a signal to the accumulator circuit 42 to accumulate sets of four sensor samples, divide the result by four, and send this final data to the processor for analysis.

This principle is applied continuously as the transport speed is reduced to obtain an arbitrary speed dynamic range, with the speed sensor determining a speed range, sub-line spacing, speed compensation multiplier, accumulation control and divide control. Over this range, the integration time of the sensor is held within a 2:1 range, preserving signal to noise ratio and simplifying the sensor electronics while maintaining geometric and photometric accuracy of the data used by the rest of the system.

Obviously numerous modifications may be made to the invention without departing from its scope as defined in the appended claims:

We claim:

1. An image acquisition apparatus comprising:

a drum for rotating a sheet with an object at an actual speed;

scanning means for scanning said image, said scanning means generating a stream of scanned data having amplitudes dependent on said actual speed;

speed detection means for monitoring said actual speed, said speed detection means generating a multiplier signal selected in accordance with a difference between said actual speed and a nominal speed;

multiplying means for multiplying said amplitudes with said multiplier signal for compensating for variations of said actual speed from said nominal speed; and accumulating means for accumulating output signals from said multiplying means, said accumulating means being constructed and arranged to combine several data streams from said multiplying means into a single data stream.

2. The apparatus of claim 1 wherein said scanning means scans said image at a scanning rate and wherein said scanning means changes said scanning rate in accordance with said speed.

3. A method of image acquisition comprising the steps of:

transporting an object past a sensor at an actual speed by a drum;

generating with said sensor a stream of sensor signals, each sensor signal having an amplitude dependent on said actual speed, said stream of signals corresponding to a line scan of said object;

monitoring said actual speed to generate a multiplier signal indicative of a variation of said speed from a nominal speed;

multiplying said amplitudes by said multiplier signal for compensating said sensor signals for variations of said actual speed to obtain a stream of speed adjusted signals; and accumulating output signals from said multiplying signals, said accumulating step including the step of combining several data streams of speed adjusted signals into a single data stream.

4. The method of claim 3 wherein said sensor generates said stream of sensor signals at a first scanning rate when said object is transported at a first speed, and wherein said sensor generates said stream of said sensor signals at a second rate which is higher then said first rate when said object is transported at a second speed lower than said first speed.

5. The method of claim 4 wherein said second rate is double said first rate when said second speed is lower than half of said first speed, to produce two consecutive streams of sensor signals for each line scan.

6. The method of claim 5 wherein said step of accumulating includes the step of accumulating said two consecutive streams to produce a combined stream of signals.

7. A method of image acquisition comprising the steps of:

transporting an object past a sensor at an actual speed;

generating with said sensor a stream of sensor signals, each sensor signal having an amplitude dependent on said actual speed, said stream of signals corresponding to a line scan of said object;

monitoring said actual speed to generate a multiplier signal indicative of a variation of said speed from a nominal speed;

multiplying said amplitudes by said multiplier signal for compensating said sensor signals for variations of said actual speed to obtain a stream of speed adjusted signals; and accumulating output signals from said multiplying signals, said accumulating step including the step of combining several data streams of speed adjusted signals into a single data stream wherein said sensor generates said stream of sensor signals at a first scanning rate when said object is transported at a first speed, and wherein said sensor generates said stream of said sensor signals at a second rate which is higher then said first rate when said object is transported at a second speed lower than said first speed.

* * * * *